United States Patent [19]
Johnson

[11] Patent Number: 5,428,922
[45] Date of Patent: Jul. 4, 1995

[54] MULTI-TIER GARDEN PLANTER WITH SECTIONAL TUBS

[76] Inventor: Hugh A. Johnson, 114 Third St., Lakeview, Mich. 48850

[21] Appl. No.: 185,253

[22] Filed: Jan. 24, 1994

[51] Int. Cl.6 ............................................. A01G 31/00
[52] U.S. Cl. .......................................... 47/82; 47/62
[58] Field of Search ............................ 47/82, 83, 62

[56] References Cited

U.S. PATENT DOCUMENTS

| | | | |
|---|---|---|---|
| 1,217,239 | 2/1917 | Swartz. | |
| 2,651,143 | 9/1953 | Esmay et al. | 47/33 |
| 2,837,866 | 6/1958 | Esmay et al. | 47/33 |
| 3,063,196 | 11/1962 | Pauer | 47/38 |
| 3,293,798 | 12/1966 | Johnson, Sr. | 47/34.12 |
| 3,374,574 | 3/1968 | Haile | 47/34.12 |
| 3,452,475 | 7/1969 | Johnson, Sr. | 47/38 |
| 3,686,791 | 8/1972 | Mills | 47/83 |
| 3,738,060 | 6/1973 | Jullien-Davin | 47/38.1 |
| 3,841,023 | 10/1974 | Carlyon, Jr. | 47/38 |
| 4,006,559 | 2/1977 | Carlyon, Jr. | 47/39 |
| 4,033,072 | 7/1977 | Kobayashi et al. | 47/62 |
| 4,419,843 | 12/1983 | Johnson | 47/82 |
| 4,614,056 | 6/1986 | Farkas | 47/67 |
| 4,737,543 | 4/1988 | Erdmann | 47/83 |
| 4,825,592 | 5/1989 | Earls | 47/82 |
| 4,920,695 | 5/1990 | Garden | 47/83 |
| 5,136,807 | 8/1992 | Orlov | 47/83 |
| 5,309,671 | 5/1994 | Byan | 47/83 |

*Primary Examiner*—Henry E. Raduazo
*Attorney, Agent, or Firm*—Jacobson, Price, Holman & Stern

[57] ABSTRACT

A multi-tier garden planter which includes a bottom tub or ground tub, a plurality of retaining tubes, a sectional central pipe and a plurality of vertically oriented and vertically spaced flared tubs or receptacles each of which contains a quantity of soil together with an irrigation structure to facilitate the growing of plants. The tubs and retaining tubes are each constructed of arcuate segments of lightweight sheet plastic material with the ends of the segments being connected and locked together by a unique locking assembly to enable the components of the planter to be transported and stored in a compact, knocked down condition with the planter being easily assembled at a point of use.

17 Claims, 2 Drawing Sheets

MULTI-TIER GARDEN PLANTER WITH SECTIONAL TUBS

BACKGROUND OF THE INVENTION

1. Field of the Invention

This invention relates to a multi-tier garden planter which includes a bottom tub or ground tub, a plurality of retaining tubes, a sectional central pipe and a plurality of vertically oriented and vertically spaced flared tubs or receptacles each of which contains a quantity of soil together with an irrigation structure to facilitate the growing of plants. The tubs and retaining tubes are each constructed of arcuate segments of lightweight sheet plastic material with the ends of the segments being connected and locked together by a unique locking assembly to enable the components of the planter to be transported and stored in a compact, knocked down condition with the planter being easily assembled at a point of use.

2. Description of the Prior Art

My prior U.S. Pat. No. 4,419,843 discloses a multi-tier planter incorporating a base with an upstanding tubular post connected thereto and a plurality of tubs receiving soil or other growth medium with the tubs being stacked in spaced relation combined with an irrigation assembly for maintaining the soil or growth medium in a desired moist condition. My prior U.S. Pat. Nos. 3,293,798 and 3,452,475 also disclose multi-tier planter structures. In addition to my prior patents, the following U.S. patents are relevant to this invention:

U.S. Pat. Nos. 1,217,239
2,651,143
2,837,866
3,063,196
3,374,574
3,738,060
3,841,023
4,006,559
4,033,072
4,614,056
4,825,592

In addition to above, the prior art cited in my above listed prior patents is also made of record herein by reference thereto.

While the prior art in this field of endeavor discloses the basic concept of multi-tier planters, the prior art does not contemplate a structure which enables the components of the planter to be transported and supplied to a consumer or user while in a knocked down, compact condition which is attained by the use of segmental peripheral wall structures in which the segments are uniquely detachably connected in end to end relation and have a top and bottom peripheral edge to form the components of the planter with the detachable connection enabling the components to be stored, transported and delivered while in a compact, knocked down condition with the planter being easily and quickly assembled without the use of special tools or special skills.

SUMMARY OF THE INVENTION

An object of the present invention is to provide a multi-tier garden planter with segmental, flared tubs that provide unique improvements over the structures disclosed in my prior patents and more specifically to a planter in which the tubs which support the soil or growth medium are of segmental construction with the individual segments having detachable ends by which the segments can be easily assembled at the site of use thereby enabling the planter to be transported or shipped and stored in a compact, knocked down condition for effectively reducing the space needed for storage and reducing the costs of transporting and handling the planter.

Another object of the invention is to provide a planter in accordance with the preceding objects in which the segments of the tubs are constructed from lightweight flexible sheet plastic material having the end edges thereof connected together in a detachable but secure manner by a unique locking assembly which includes a split tube receiving inturned flange ends of adjacent segments with a locking pipe or tube then inserted into the slotted tube or pipe in engaging relation to the inturned flange ends on the end edges of the adjacent segments of the tub.

Still another object of the invention is to provide a multi-tier planter in accordance with the preceding objects in which the bottom portion of the tubs incline toward a sectional center pipe from a larger diameter upper end of the tubs in a downwardly and inwardly inclined relation with the bottom edge of each assembled tub resting on gravel and sand in a retaining tube with the retaining tubes being in stacked relation and receiving the lower end of the tubs therebetween. A sectional central pipe is positioned centrally of the tubs and tubes with the central pipe being perforated for communicating the soil or growth medium with the interior of the central pipe to enable circulation of air and discharge of excess moisture in relation to the growth medium.

Still another object of the invention is to provide a multi-tier planter incorporating the above objects and including a unique structure for irrigating the soil or growth supporting medium within the tubs with the entire structure being constructed of relatively inexpensive and commercially available plastic materials.

These together with other objects and advantages which will become subsequently apparent reside in the details of constructions and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
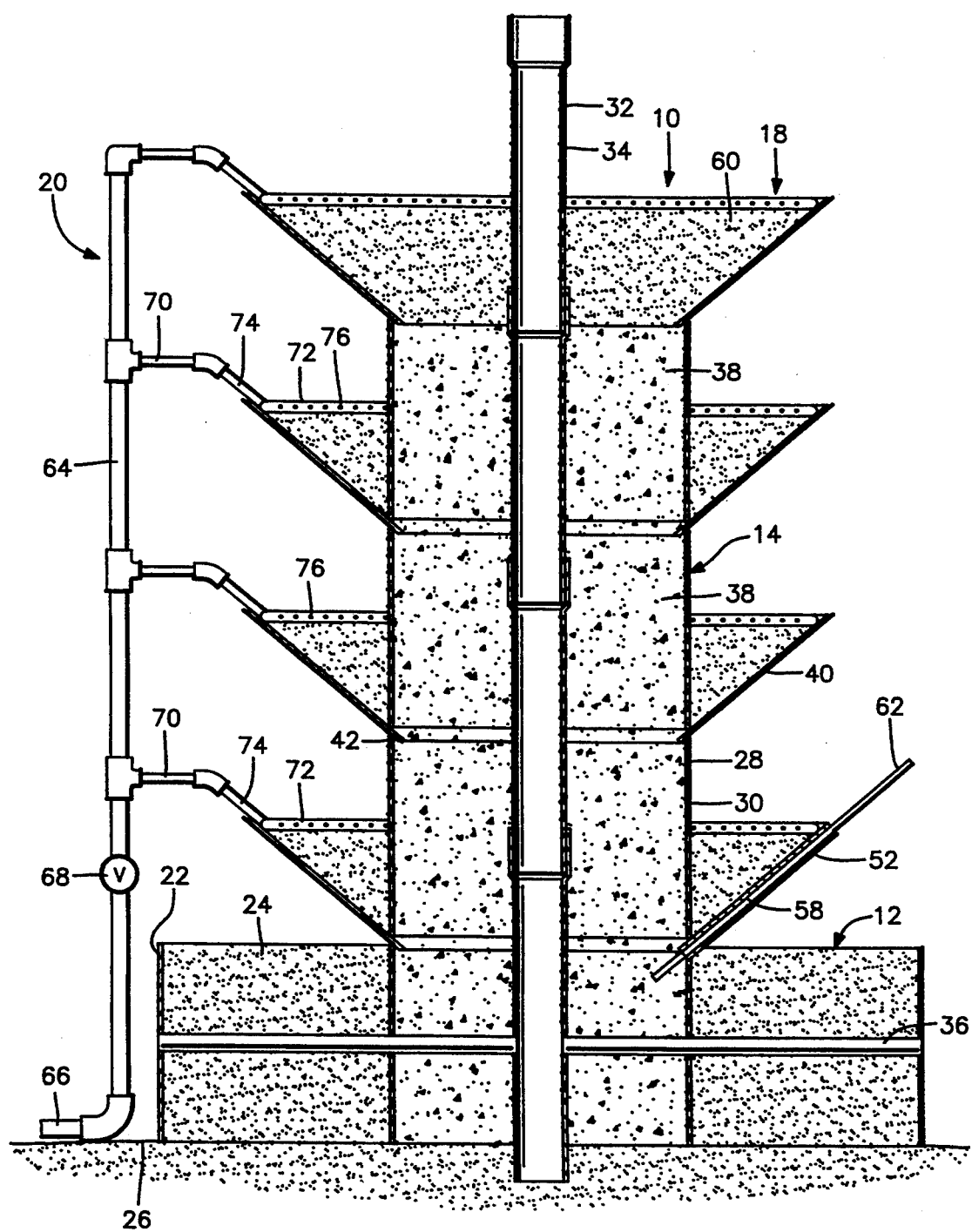
FIG. 1 is a vertical sectional view of the multi-tier garden planter with segmental tubs and retaining tubes of the present invention.
Figure 2:
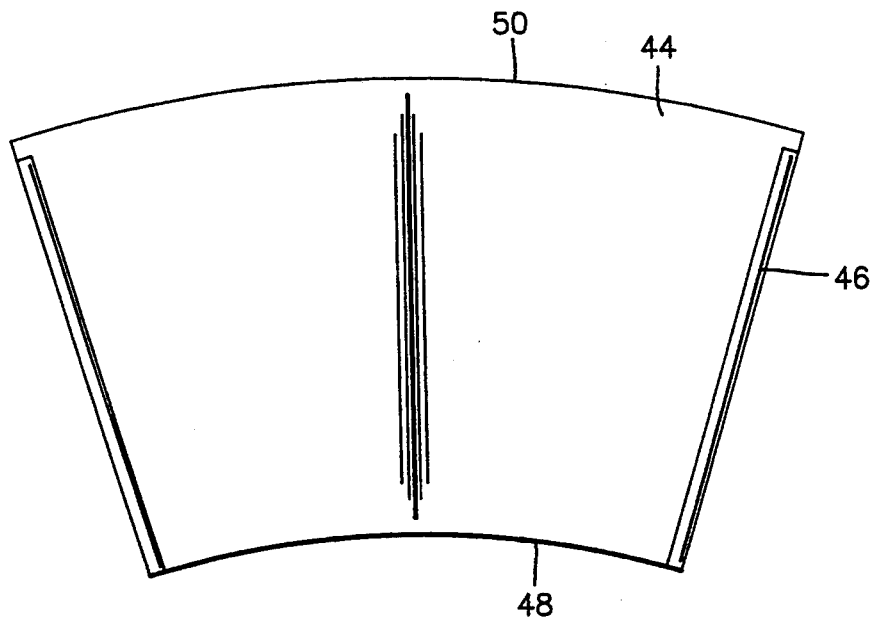
FIG. 2 is a plan view of one of the segments of the tubs.

The multi-tiered planter of the present invention is illustrated in its entirety in FIG. 1 and is generally designated by reference numeral 10 and includes a bottom pan 12, a plurality of upstanding, cylindrical retaining tubes 14, a central upstanding sectional pipe 16, a plurality of segmental flared tubs 18 and an irrigation assembly 20.

The bottom pan or tub 12 is a pan shaped member including an open bottom defined by an upstanding cylindrical peripheral wall 22 which terminates in an open top. The bottom tub or pan 12 is filled with a quantity of soil 24 and rests on the ground surface 26. The central pipe 16 is of substantially less diameter than the wall 22 and is concentric therewith. As illustrated, each retaining tube 14 includes a cylindrical wall 28 having a plurality of apertures 30 therein. The pipe 16 is a sectional tubular member 32 having a plurality of apertures 34 therein. The lower end of the pipe 32 may penetrate a short distance into the ground surface 26 for stability. A pair of diametrically extending tubes 36 are connected with the pipe 32 and communicate with the interior thereof and extend outwardly through the cylindrical peripheral wall 28 of the lowermost retaining tube 14 and are connected with and extend through the peripheral wall 22 and terminate in flush relationship therewith to provide air communication from the exterior of the bottom tub 12 to the interior of the sectional pipe 32 forming the central pipe 16. Thus, air may freely circulate through the tubes 36 and up through the central pipe 16.

A plurality of vertically spaced, outwardly and upwardly flared tubs 18 are supported by the retaining tubes 14 and the sand and gravel 38 which fills each tube 14. Each tub 18 has a segmental wall 40 with the lower edge 42 extending inwardly between the retaining tubes 14 as shown in FIG. 1.

Each of the tubs 18 includes a peripheral wall 40 formed by a plurality of arcuate panels or segments 44 constructed of relatively thin plastic material such as PVC sheet material having a thickness on the order of 1/16 inch. The panels 44 each include outwardly and upwardly diverging end edges 46, a concavely curved bottom and inner edge 48 and a convexly curved top or outer edge 50 which, when the panels 44 are interconnected to form an annular wall 40, the peripheral wall defined by the segments or panels 44 is frustoconical in configuration. As illustrated in FIG. 1, when the panels or segments 44 are assembled into the condition illustrated in FIG. 3, the bottom and inner edge 42 of the peripheral wall 40 of the tub 18 rests against the top edge of the cylindrical wall 28 which forms the retaining tube 14 and are supported by the sand and gravel 38 in a manner that will securely support the tub 18 but at the same time enable the tub 18 to be removed. The retaining tubes 14 and the bottom tub 12 are constructed from similar flexible plastic segments having straight top and bottom edges.

Figure 3:
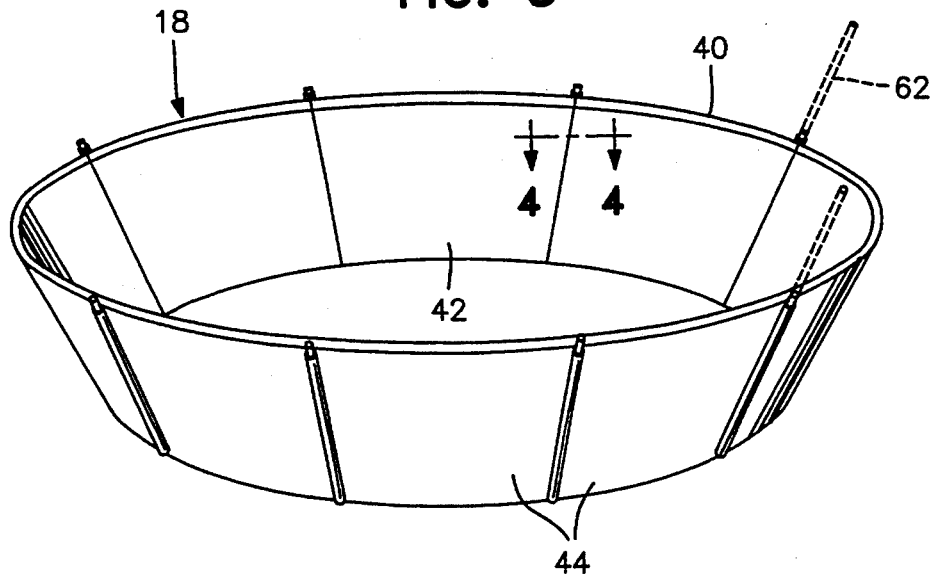
FIG. 3 is a perspective view of an assembled tub.
Figure 4:
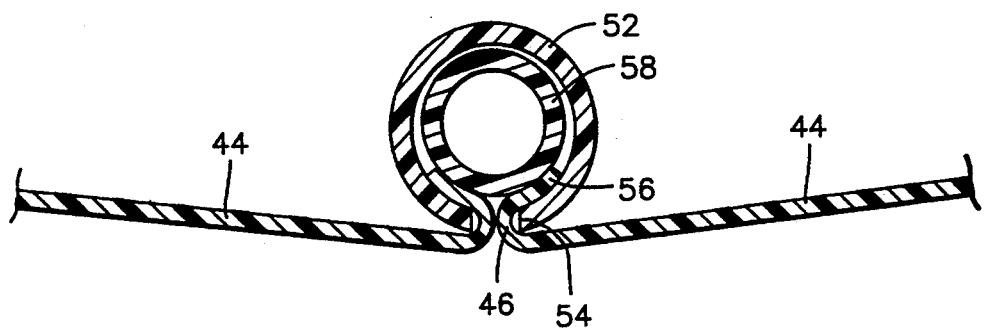
FIG. 4 is a sectional view, on an enlarged scale, taken along section line 4—4 on FIG. 3 illustrating the specific structural details of the locking assembly which connects adjacent end edges of the tub segments.

FIG. 3 illustrates the assembled tub 18 and FIG. 4 illustrates the structure connecting the inclined edges 46 of the panels or segments 44 together. This structure includes an elongated pipe 52 of cylindrical configuration having a continuous longitudinal slot 54 formed therein. Each end edge 46 of the panels or segments 44 include a reversely curved flange 56 which is received within the interior of the pipe 52 and extend through the slot 54. As illustrated in FIG. 4, the flanges 56 on two adjacent panels or segments 44 extend through the slot 54 and are positioned along the interior surface of the pipe 52. To retain the flanges 56 assembled with respect to the pipe 52, a locking pipe 58 of slightly smaller outside diameter than the inside diameter of the pipe 52 is longitudinally inserted into the pipe 52 and into engagement with the inner surfaces of the flanges 56 as illustrated in FIG. 4 with the locking pipe 58 functioning to prevent disassembly of the panels or segments 44 in relation to the pipe 52 and in relation to each other.

While the materials and dimensions of the components may vary, the slotted pipe 52 may be approximately 11 inches in length and provided with an inside diameter of ¾ inches and a slot approximately 3/16 inches wide. The locking pipe 58 is longer than the pipe 52 and longer than the panels or segments 44 and may have an inside diameter of ⅝ inch. The panels or segments 44 are constructed of sheet plastic and may be flexible in order to form an arcuate configuration with the flanges being reversely formed and oriented at approximately 15° in relation to the plane of the remainder of the panel 44 when in a flat condition with the assembly of the pipe 52 in relation to the flanges being by a longitudinal sliding movement and the assembly of the locking pipe 58 also being by a longitudinal sliding movement. The panels may have a top length of just over 20 inches and extending through an arc of approximately 40° with a radius of approximately 36 inches and the radius of the inner edge 48 may be approximately 26 inches to produce a vertical height of each tub of approximately 10 inches. As indicated, these dimensions may vary depending upon the plants to be grown and the quantity of soil or growth supporting medium 60 to be positioned in each tub 18. The pipes 52 and 58 as well as the panels 44 are preferably constructed of polyvinyl chloride with each tub including eight sections with the locking pipes 58 extending above the top edge 50 as at 62 for providing a support for vines to provide a more effective support for foliage which may result from the plants growing in the tubs.

The irrigation assembly 20 includes a vertically disposed supply pipe 64 oriented generally parallel to the retaining tubes 14 and spaced outwardly from the tubs 12 and 18 with the lower end of the pipe 64 having a branch pipe 66 extending to a source of irrigation water with a control valve 68 being provided for controlling flow into the supply pipe 64. A plurality of branch pipes 70 are connected to the pipe 64 generally in perpendicular relation thereto and generally in vertically spaced relation with the branch pipes extending to and connected with annular spray pipes 72 with a suitable connection 74 being provided between the branch pipes 70 and the annular spray pipes 72. The spray pipes 72 include very small discharge openings 76 on the interior thereof to produce a mist discharge of water, nutrients and the like onto the surface of the soil 40 with the valve 68 controlling the flow or flow rate of irrigation liquid. The distribution pipes 72 are supported directly on the upper edge of the soil in tubs 18 with the pipes 72 being retained in place by the upper edge of peripheral wall 40. All of the irrigation pipes also are preferably polyvinyl chloride.

The planter of this invention generally functions in the same manner as the structure in U.S. Pat. No. 4,419,843 with the perforated retainer tubes 14 and central pipe 16 permitting passage of air or liquid in either direction and the pipes 36 and central pipe 16 providing air passage in either direction.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A planter comprising a bottom tub, a plurality of vertically stacked retaining tubes extending upwardly from said bottom tub, plurality of vertically spaced flared tubs supported from said retaining tubes and receiving plant growth supporting medium, each of said flared tubs including an outwardly and upwardly inclined peripheral wall having an inner bottom edge extending between said retaining tubes and an upper outer edge spaced from a vertically adjacent flared tub, each flared tub including an open upper area in which plants may grow from the plant growth supporting medium, said bottom tub resting on a ground surface and including a peripheral wall receiving a quantity of soil, said retaining tubes including a peripheral wall having a perforated area and receiving a quantity of sand and gravel, a perforated central pipe extending vertically upwardly from the bottom tub through the retaining tubes, each upwardly and outwardly inclined peripheral wall including a plurality of segments each being constructed of a thin, substantially flexible plastic panel having end edges which are reversely curved to form a short, generally hooked shaped flange on each end edge of the panel, and means connecting the end edges of the wall segments including a substantially rigid pipe having a longitudinal slot therein receiving the flanges on the end edges of adjacent wall segments, a locking member inserted into the slotted pipe in engagement with the flanges to hold the flanges against an interior of the slotted pipe adjacent to edges of the slot to prevent removal of the flanges from the slot thereby retaining the wall segments in connected relation.

2. The planter as defined in claim 1 wherein said locking member is a smaller pipe inserted into the slotted pipe and extending throughout the length thereof.

3. The planter as defined in claim 2 wherein said pipes and panels are constructed of polyvinyl chloride.

4. The planter as defined in claim 1 wherein said peripheral wall of each retaining tube is vertically aligned.

5. The planter as defined in claim 1 together with means discharging a liquid onto plant growth supporting medium in each flared tub.

6. The planter as defined in claim 5 wherein said means discharging liquid includes an annular distribution pipe at the upper end of the inclined peripheral wall of each flared tub with the distribution pipe having a plurality of small apertures in an inner surface thereof for discharging liquid as a mist onto the plant growth medium within the flared tub.

7. The planter as defined in claim 6 wherein each of said distribution pipes are connected to a vertically disposed supply pipe outwardly of the periphery of the flared tubs with a branch line interconnecting each of the distribution pipes and the vertically disposed supply pipe, said supply pipe including means for connection with a source of liquid and a control valve for controlling the rate of flow of liquid to the distribution pipes.

8. The planter as defined in claim 7 wherein said locking member is a smaller pipe inserted into the slotted pipe and extending throughout the length thereof, said pipes and panels being constructed of polyvinyl chloride.

9. The planter as defined in claim 1 wherein said bottom tub is a pan shaped member having a peripheral wall and an open bottom resting on a ground surface, said central pipe having a lower end supported from the ground surface and extending upwardly through the bottom tub and retaining tubes and above the uppermost flared tub.

10. The planter as defined in claim 9 wherein said centrally disposed perforated pipe is mounted concentrically of the bottom tub and extends through the open bottom, radially extending air pipes extending from a lower end portion of the central pipe to and through the peripheral wall of the bottom tub to provide air movement through the interior of the pipe, through the perforations in the pipe and through the perforations in the retaining tubes into the plant growth supporting medium in the flared tubs.

11. The planter as defined in claim 2 wherein said smaller pipe extends above an upper edge of the inclined peripheral wall of the flared tubs to support plants being grown in the flared tubs.

12. The planter as defined in claim 1 wherein said central pipe is sectional to enable the pipe and wall segments to be stored and transported in knocked down condition and assembled at a point of use.

13. A planter comprising a plurality of vertically stacked, aligned, generally cylindrical retaining tubes, each tube including a peripheral wall having a perforated area, each of said tubes having open top and bottom ends and being filled with a column of sand and gravel, and a plurality of outwardly flared tubs, each tub including an upwardly and outwardly inclined imperforate wall, each inclined imperforate wall having an upper outer end and a lower inner end, the lower inner end of each inclined imperforate wall except that of the uppermost of said flared tubs extending between adjacent retaining tubes and being supported in vertically spaced relation by said retaining tubes, plant growth supporting material in each of said tubs, and means introducing liquid into each tub at the outer upper end of said inclined wall to support growth of plants, said inclined imperforate peripheral wall of the tubs and the perforated areas in the peripheral wall of the retaining tubes enabling discharge of liquid from all of said tubs into the sand and gravel column in said retaining tubes, the lowermost retaining tube resting on a support surface for drainage of liquid downwardly through column of sand and gravel in the retaining tubes.

14. The planter as defined in claim 13 wherein said means introducing liquid into each tub includes a peripheral distribution pipe along the upper outer end of each inclined imperforate wall, the uppermost of said outwardly flared tubs having the lower inner end of said imperforate inclined wall supportingly engaged with the uppermost retaining tube, the inclined imperforate wall forming each outwardly flared tub directing liquid directly into the column of sand and gravel in the retaining tubes.

15. The planter as defined in claim 13 together with a vertically extending pipe oriented centrally of the retaining tubes and having a lower end extended into the support surface for anchoring the planter.

16. The planter as defined in claim 15 wherein said pipe is perforated to facilitate drainage of liquid from the column of sand and gravel.

17. The planter as defined in claim 13 wherein said imperforate, inclined peripheral wall of each flared tub includes a plurality of arcuate segments, means detachably connecting ends of said arcuate segments to form said inclined wall thereby enabling the tubs to be transported and stored in a knocked down, compact condition.

* * * * *